United States Patent
Toda et al.

(10) Patent No.: US 11,891,136 B2
(45) Date of Patent: Feb. 6, 2024

(54) STEERING CONTROL DEVICE

(71) Applicant: Mitsubishi Electric Corporation, Tokyo (JP)

(72) Inventors: Taizo Toda, Tokyo (JP); Masaya Endo, Tokyo (JP)

(73) Assignee: Mitsubishi Electric Corporation, Tokyo (JP)

(*) Notice: Subject to any disclaimer, the term of this patent is extended or adjusted under 35 U.S.C. 154(b) by 601 days.

(21) Appl. No.: 17/253,693

(22) PCT Filed: Jul. 31, 2018

(86) PCT No.: PCT/JP2018/028665
§ 371 (c)(1),
(2) Date: Dec. 18, 2020

(87) PCT Pub. No.: WO2020/026342
PCT Pub. Date: Feb. 6, 2020

(65) Prior Publication Data
US 2021/0261190 A1    Aug. 26, 2021

(51) Int. Cl.
*B62D 6/00* (2006.01)
*B62D 5/04* (2006.01)

(52) U.S. Cl.
CPC .......... *B62D 6/00* (2013.01); *B62D 5/0409* (2013.01); *B62D 5/0463* (2013.01)

(58) Field of Classification Search
CPC ...... B62D 6/00; B62D 5/0409; B62D 5/0463; B62D 6/04
See application file for complete search history.

(56) References Cited

U.S. PATENT DOCUMENTS 5,641,212 A * 6/1997 Sakai .................. B60T 8/17552
303/147
8,655,550 B2   2/2014 Nakamura et al.
(Continued)

FOREIGN PATENT DOCUMENTS

JP    2005-219681 A    8/2005
JP    2010-254178 A    11/2010

OTHER PUBLICATIONS

International Search Report for PCT/JP2018/028665, dated Oct. 30, 2018
(Continued)

*Primary Examiner* — Rami Khatib
(74) *Attorney, Agent, or Firm* — Sughrue Mion, PLLC; Richard C. Turner

(57) ABSTRACT

A steering control device includes a transverse gradient estimator configured to estimate a transverse gradient of a road surface on which a vehicle travels; an assisting amount calculator configured to calculate a first assisting amount based on the transverse gradient; a low pass filter configured to perform a low pass filter processing for the first assisting amount, and output the processed first assisting amount subjected to the low pass filter processing, as a second assisting amount; and a motor controller configured to control a motor that generates a steering assist torque, using the second assisting amount. The low pass filter switches a cut-off frequency of the low pass filter between a first cut-off frequency and a second cut-off frequency that is set to a value higher than the first cut-off frequency, depending on whether the second assisting amount increases with time or the second assisting amount decreases with time.

13 Claims, 15 Drawing Sheets

(56) References Cited

U.S. PATENT DOCUMENTS

2012/0303218 A1    11/2012  Tamura et al.
2016/0368531 A1*   12/2016  Nakakuki ............ B62D 5/0409
2020/0172164 A1*    6/2020  Mitsumoto .......... B62D 15/021

OTHER PUBLICATIONS

Communication dated Aug. 16, 2021 by the Indian Patent Office in application No. 202127003147.

* cited by examiner

STEERING CONTROL DEVICE

CROSS REFERENCE TO RELATED APPLICATIONS

This application is a National Stage of International Application No. PCT/JP2018/028665 filed Jul. 31, 2018.

TECHNICAL FIELD

The present invention relates to a steering control device for controlling a motor that generates a steering assist torque.

BACKGROUND ART

Conventionally, there have been proposed technologies of assisting a driver's steering so as to suppress a deflection of a vehicle traveling on a transverse gradient road (For example, see Patent Document 1). Specifically, the conventional technology disclosed in Patent Document 1 estimates an external disturbance due to a transverse gradient and a lateral directional disturbance caused by cross wind or the like, and controls a steering assist torque so as to suppress the lateral directional disturbance based on a result of the estimation.

CITATION LIST

Patent Literature

[PTL 1] JP 2005-219681 A

SUMMARY OF INVENTION

Technical Problem

Because the conventional technology described in Patent Document 1 estimates a disturbance due to a transverse gradient of a road surface on which the vehicle travels, it is possible to assist the driver's steering correspondingly to an amount of change in the transverse gradient. However, due to noises contained in the estimation, assisting of the steering torque may interfere with the driver's steering.

The present invention has been made to solve the above-described problem, and has an object to obtain a steering control device that can suppress an interference between assisting of a steering torque and driver's steering, while assisting the driver's steering correspondingly to a change in a transverse gradient of a road surface on which a vehicle travels.

Solution to Problem

According to an aspect, a steering control device includes a transverse gradient estimator configured to estimate a transverse gradient of a road surface on which a vehicle travels; an assisting amount calculator configured to calculate a first assisting amount based on the transverse gradient estimated by the transverse gradient estimator; a low pass filter configured to perform a low pass filter processing for the first assisting amount calculated by the assisting amount calculator, and output the first assisting amount subjected to the low pass filter processing, as a second assisting amount; and a motor controller configured to control a motor that generates a steering assist torque, using the second assisting amount output by the low pass filter. The low pass filter switches a cut-off frequency of the low pass filter between a first cut-off frequency and a second cut-off frequency that is set to a value higher than the first cut-off frequency, depending on whether the second assisting amount increases with time or the second assisting amount decreases with time.

Advantageous Effects of Invention

According to the present invention, it is possible to obtain a steering control device that can suppress an interference between assisting of a steering torque and driver's steering, while assisting the driver's steering correspondingly to a change in a transverse gradient of a road surface on which a vehicle travels.

DESCRIPTION OF EMBODIMENTS

Figure 1:
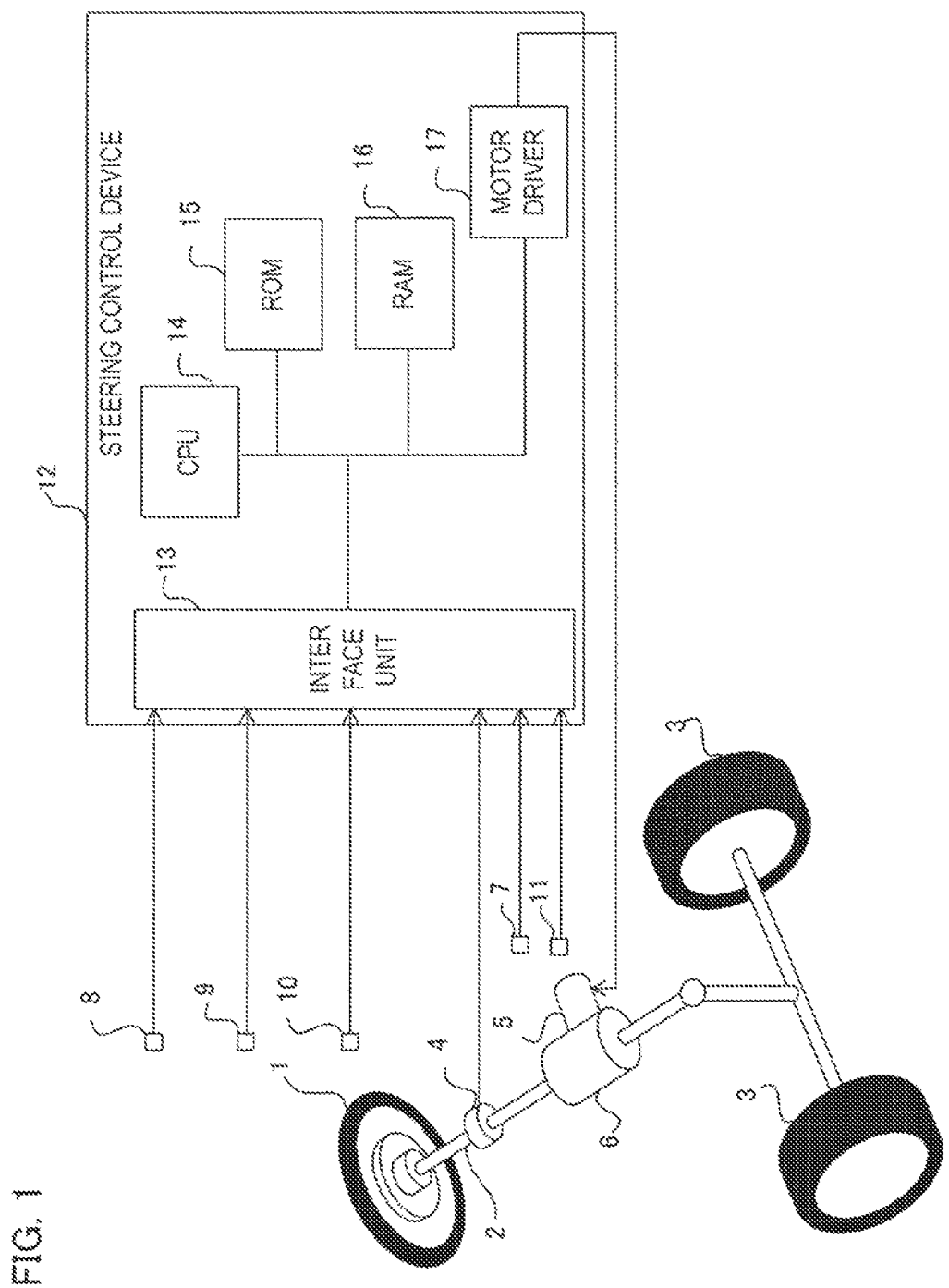
FIG. 1 is a diagram depicting a configuration of a steering control device according to a first embodiment and a peripheral device thereof.

In the following, a steering control device according to preferred embodiments will be described with reference to drawings. In the explanation of the drawings, the same or corresponding components or parts are denoted with the same reference numerals, respectively, and redundant explanation will be omitted.

First Embodiment

FIG. 1 is a diagram depicting a configuration of a steering control device 12 according to a first embodiment and a peripheral device thereof.

FIG. 1 shows a steering mechanism of a vehicle, such as an automobile, provided with a steering wheel 1 and a steering shaft 2. Right and left turning wheels 3 of the vehicle are turned in response to a rotation of the steering shaft 2 that rotates in accordance with an operation for the steering wheel 1 by a driver who drives the vehicle.

The steering shaft 2 is provided with a steering torque sensor 4. The steering torque sensor 4 detects a steering torque acting on the steering shaft 2 via the steering wheel 1 according to the operation for the steering wheel 1 by the driver.

A motor 5 is connected to the steering shaft 2 via a deceleration mechanism 6. The motor 5 generates a steering assist torque to be given to the steering shaft 2 in accordance with controlling of an electric current flowing through the motor 5 by a steering control device 12, which will be described later. Thus, the driver's steering can be assisted by the steering assist torque.

A motor rotation angle sensor 7 detects a rotation angle of the motor 5. A steering velocity of the steering wheel 1 is calculated from a differential value of the rotation angle of the motor 5 detected by the motor rotation angle sensor 7. A current sensor 11 detects an electric current flowing in the motor 5.

The vehicle is provided with a vehicle velocity sensor 8, a yaw rate sensor 9, and a lateral acceleration sensor 10. The vehicle velocity sensor 8 detects a vehicle velocity, which is a traveling velocity of the vehicle. The yaw rate sensor 9 detects a yaw rate that corresponds to an angular velocity of rotation of the vehicle. The lateral acceleration sensor 10 detects a lateral acceleration of the vehicle.

The steering control device 12 acquires results of detection by the respective sensors, described as above, and calculates a target torque which is a target value for the steering assist torque based on the acquired results. The steering control device 12 controls the motor 5 so that the steering assist torque generated by the motor 5 coincides with the target torque calculated as above.

The steering control device 12 is realized by a hardware configuration, for example, shown in FIG. 1. That is, the steering control device 12 includes an interface unit 13 that acquires results of detection by the respective sensors, a microcomputer that performs arithmetic processing, and a motor driver that supplies electric current to the motor 5 and thereby drives the motor 5. The microcomputer includes a central processing unit (CPU) 14, a read only memory (ROM) 15, and a random-access memory (RAM) 16.

Figure 2:
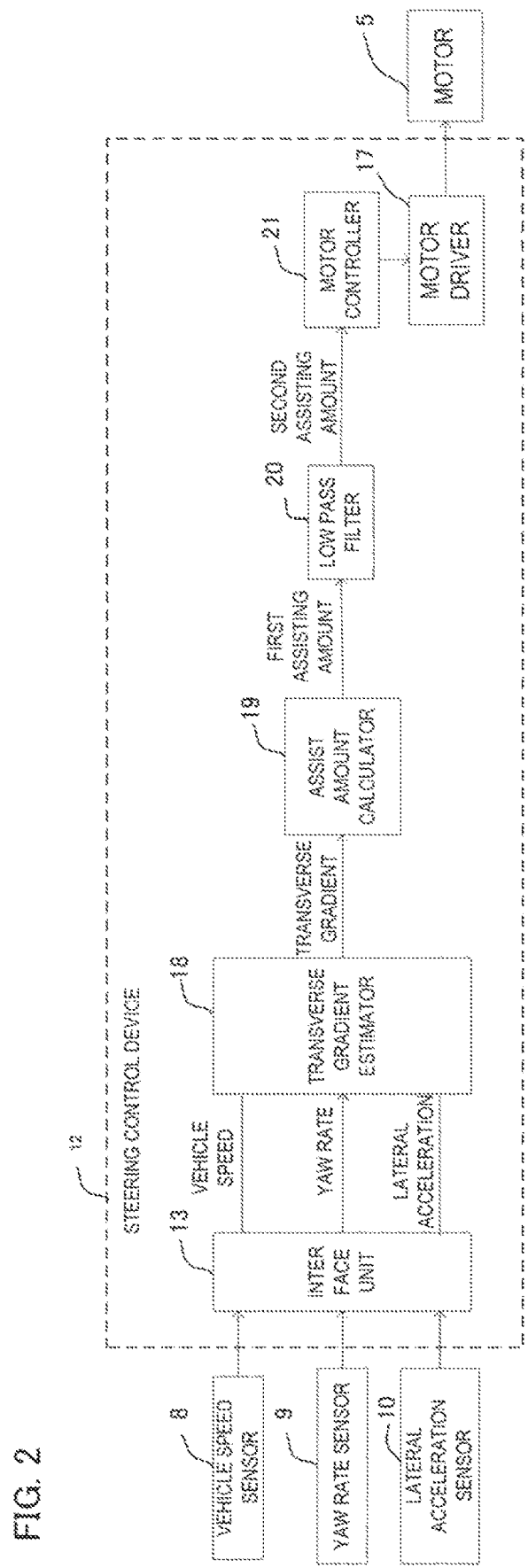
FIG. 2 is a block diagram depicting a configuration of the steering control device according to the first embodiment.

In the following, a function configuration of the steering control device 12 will be described with reference to FIG. 2. FIG. 2 is a block diagram depicting a configuration of the steering control device 12 according to a first embodiment.

FIG. 2 shows that the steering control device 12 includes the interface unit 13; a transverse gradient estimator 18; an assisting amount calculator 19; a low pass filter 20; a motor controller 21; and a motor driver 17.

The transverse gradient estimator 18 acquires a vehicle velocity from the vehicle velocity sensor 8 via the interface unit 13, acquires a yaw rate from the yaw rate sensor, and acquires a lateral acceleration from the lateral acceleration sensor 10. The transverse gradient estimator 18 estimates a transverse gradient based on the acquired vehicle velocity, the acquired yaw rate and the acquired lateral acceleration, and outputs the transverse gradient to an assisting amount calculator 19.

Figure 3:
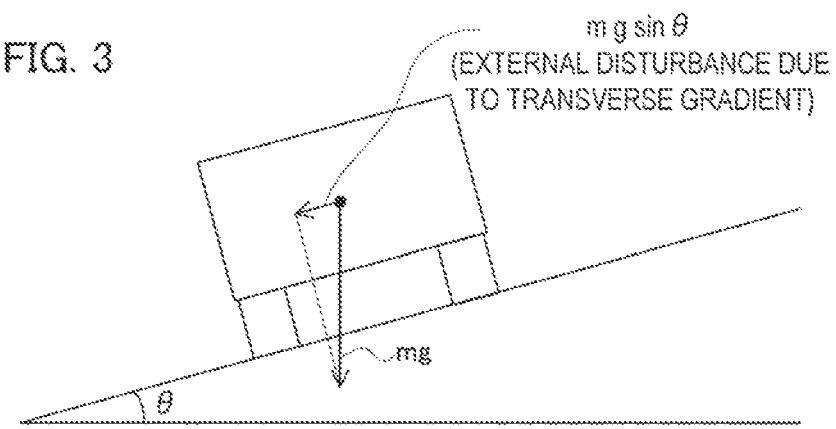
FIG. 3 is a diagram schematically depicting an external disturbance due to transverse gradient acting on a vehicle according to the first embodiment.

In the following, an example of a method of estimating a transverse gradient by the transverse gradient estimator 18 will be described with reference to FIG. 3. FIG. 3 is a diagram schematically depicting an external disturbance due to transverse gradient acting on a vehicle, according to the first embodiment. In FIG. 3, m represents a mass of the vehicle, g represents the gravitational acceleration, and θ represents a transverse gradient of a road surface on which the vehicle travels.

FIG. 3 shows that an inclination of the road surface on which the vehicle travels corresponds to the transverse gradient θ. The transverse gradient estimator 18 estimates the transverse gradient θ by performing calculation for the transverse gradient θ according to formula (1) using the vehicle velocity V acquired from the vehicle velocity sensor 8, the yaw rate γ acquired from the yaw rate sensor 9, the lateral acceleration Gy acquired from the lateral acceleration sensor 10, as follows:

$$\theta = \arcsin((dvy/dt + V\gamma - Gy)/g) \approx \arcsin(V\gamma - Gy)/g). \quad (1)$$

In the formula (1), shown above, dvy/dt represents a temporal change of a lateral velocity of the vehicle. In the present example, the vehicle is assumed to perform steady traveling, which is close to linear traveling, and the temporal change of the lateral velocity is set to zero (dvy/dt=0).

The method of estimating a transverse gradient by the transverse gradient estimator 18 is not limited to the above-described method. For example, the transverse gradient estimator 18 may be configured to estimate a transverse gradient by using the publicly known method disclosed in patent document 1. Moreover, the transverse gradient estimator 18 may be configured to store in advance, as map information, information on a road surface, on which a vehicle travels, and obtain a transverse gradient at each traveling spot of the vehicle from the map information.

In this way, the transverse gradient estimator 18 is configured to estimate a transverse gradient of a road surface, on which a vehicle travels. Specifically, the transverse gradient estimator 18 is configured to estimate a transverse gradient based on a vehicle velocity detected by the vehicle velocity sensor 8, a yaw rate detected by the yaw rate sensor 9, and a lateral acceleration detected by the lateral acceleration sensor 10.

The assisting amount calculator 19 calculates a first assisting amount based on the transverse gradient input from the transverse gradient estimator 18, and outputs the first assisting amount to the low pass filter 20.

In the following, an example of a method of calculating a first assisting amount by the assisting amount calculator 19 will be described.

A vehicle is assumed to travel linearly in a bicycle model, which is generally used among vehicle movement models.

In this case, lateral force 2Fy occurring in two wheels of front tires is obtained according to formula (2) as follows:

$$2Fy = -lr/(lf+lr)mg \sin\theta \quad (2)$$

In formula (2), lf represents a length from a center of gravity of the vehicle to a front wheel shaft, and lr represents a length from the center of gravity of the vehicle to a rear wheel shaft.

When a caster trail of a vehicle is represented by Lc [m], a pneumatic trail is represented by Lp [m], and an overall steering gear ratio is represented by Grp, a disturbance torque Tcant due to a transverse gradient converted into the steering shaft is obtained according to formula (3) as follows:

$$Tcant = 2Fy \times (Lc+Lp) \times Grp \quad (3)$$

In order to cancel the disturbance torque Tcant by a compensation torque Tcomp1, the compensation torque Tcomp1 is obtained according to formula (4), shown below. The compensation torque Tcomp1 is a compensation amount approximately proportional to the transverse gradient θ. Moreover, the compensation torque Tcomp1 corresponds to the first assisting amount.

$$Tcomp1 = -Tcant \quad (4)$$

The assisting amount calculator 19 performs calculation according to the above-described formulas (2), (3) and (4) using the transverse gradient θ, input from the transverse gradient estimator 18, to obtain the first assisting amount.

The method of obtaining the first assisting amount by the assisting amount calculator 19 is not limited to the above-described method. For example, the first assisting amount may be obtained by performing adaptation using an actual vehicle using the property that the first assisting amount is a compensation amount approximately proportional to the transverse gradient.

When it is not necessary to completely cancel the disturbance torque Tcant, the compensation torque Tcomp1 may be corrected by multiplying the term on the right-hand side of formula (4) with a gain smaller than one. According to the correction, it becomes possible to transmit a feeling of traveling on a transverse gradient road to a driver, while reducing the driver's load. Moreover, the compensation torque Tcomp1 may be corrected by multiplying the term on the right-hand side of formula (4) with a gain that varies in response to the vehicle velocity. According to the correction, it becomes possible to adjust the first assisting amount in response to the vehicle velocity.

As described above, the assisting amount calculator 19 is configured to calculate the first assisting amount based on the transverse gradient estimated by the transverse gradient estimator 18.

The low pass filter 20 performs a low pass filter processing for the first assisting amount calculated by the assisting amount calculator 19, and outputs the first assisting amount subjected to the low pass filter processing to the motor controller 21 as a second assisting amount.

Figure 4:
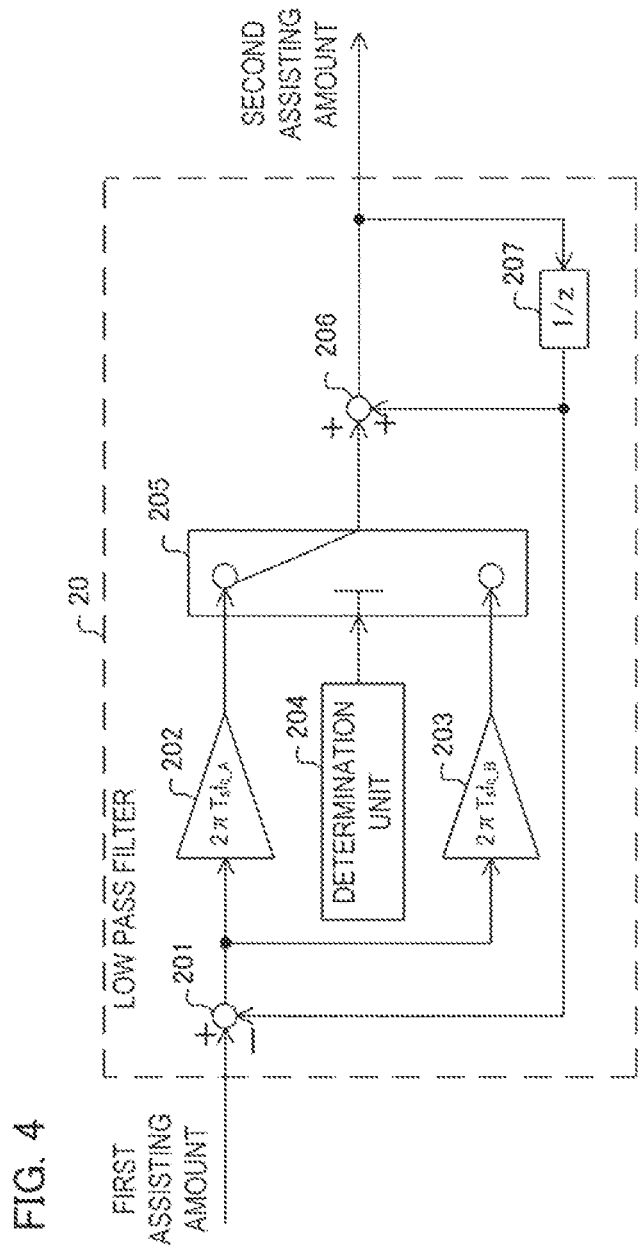
FIG. 4 is a block diagram depicting a configuration of a low pass filter according to the first embodiment.

In the following, a configuration of the low pass filter 20 will be described with reference to FIG. 4. FIG. 4 is a block diagram depicting the configuration of the low pass filter 20 according to the first embodiment.

FIG. 4 shows that the low pass filter 20 includes a subtraction unit 201, a gain unit 202, a gain unit 203, a determination unit 204, a switching unit 205, an addition unit 206, and a delay unit 207.

The subtraction unit 201 subtracts a previous value of the second assisting amount output from the delay unit 207 from the first assisting amount output from the assisting amount calculator 19, and outputs the value obtained by the subtraction to the gain unit 202 and the gain unit 203.

The gain unit 202 multiplies the value output from the subtraction unit 201 with a gain of $2\pi$ Ts fc_A, and outputs the value obtained by the multiplication to the switching unit 205. The gain unit 203 multiplies the value output from the subtraction unit 201 with a gain of $2\pi$ Ts fc_B, and outputs the value obtained by the multiplication to the switching unit 205.

In the above-described parameters, fc_A represents a first cut-off frequency set in the low pass filter 20, and fc_B represents a second cut-off frequency set in the low pass filter 20. A value of the second cut-off frequency fc_B is set to be greater than a value of the first cut-off frequency fc_A. Moreover, Ts represents a control period of the low pass filter 20.

The determination unit 204 compares the first assisting amount output from the assisting amount calculator 19 with the previous value of the second assisting amount output from the delay unit 207, and determines whether the first assisting amount is greater than the previous value of the second assisting amount. The determination unit 204 outputs a result of determination to the switching unit 205.

The switching unit 205 selects either of the value output from the gain unit 202 and the value output from the gain unit 203 based on the result of determination output from the determination unit 204, and outputs the selected value to the addition unit 206.

When the first assisting amount is determined to be greater than the previous value of the second assisting amount by the determination unit 204, the switching unit 205 outputs the value output from the gain unit 202 to the addition unit 206. On the other hand, when the first assisting amount is determined to be less than the previous value of the second assisting amount by the determination unit 204, the switching unit 205 outputs the value from the gain unit 203 to the addition unit 206.

In this way, by the switching unit 205, it becomes possible to switch a cut-off frequency of the low pass filter 20 between the first cut-off frequency fc_A and the second cut-off frequency fc_B.

When the first assisting amount is greater than the previous value of the second assisting amount, i.e. the second assisting amount increases with time, the cut-off frequency of the low pass filter 20 is set to the first cut-off frequency fc_A. On the other hand, when the first assisting amount is less than the previous value of the second assisting amount, i.e. the second assisting amount decreases with time, the cut-off frequency of the low pass filter 20 is set to the second cut-off frequency fc_B.

The addition unit 206 adds the value output from the switching unit 205 to the previous value of the second assisting amount output from the delay unit 207, and outputs the value obtained by the addition as a second assisting amount.

The delay unit 207 outputs the previous value of the second assisting amount to the addition unit 206 and the subtraction unit 201. The symbol z represents an operation of the z-transformation, and 1/z represents a previous value.

In this way, the low pass filter 20 switches the cut-off frequency of the low pass filter 20 between the first cut-off frequency fc_A and the second cut-off frequency fc_B depending on whether the second assisting amount increases with time or decreases with time.

When the second assisting amount increases with time, the low pass filter 20 sets the cut-off frequency of the low pass filter 20 to the first cut-off frequency fc_A. Moreover, when the second assisting amount decreases with time, the low pass filter 20 sets the cut-off frequency of the low pass filter 20 to the second cut-off frequency fc_B.

Next, setting of the first cut-off frequency fc_A and the second cut-off frequency fc_B will be described. As described above, the second cut-off frequency fc_B is set to be a value greater than the first cut-off frequency fc_A. For example, the first cut-off frequency fc_A is set to 1 [Hz] and the second cut-off frequency fc_B is set to 3 [Hz].

As described above, when the second assisting amount increases with time, the cut-off frequency of the low pass filter 20 is set to the first cut-off frequency fc_A. Thus, the second assisting amount increases slowly. On the other hand, when the second assisting amount decreases with time, the cut-off frequency of the low pass filter 20 is set to the second cut-off frequency fc_B. Thus, the second assisting amount decreases rapidly.

The greater the second cut-off frequency fc_B set for the cut-off frequency of the low pass filter 20 is, the more rapidly the second assisting amount decreases. The rapid change in decrease with time of the second assisting amount is transferred to the driver who feels that the second assisting amount changes discontinuously. As a result, the driver feels strange. Thus, the second cut-off frequency fc_B is preferably set to be less than or equal to 5 Hz, for example.

According to the above-described configuration of the low pass filter 20, it becomes possible to reduce noises in transverse gradient estimated by the transverse gradient estimator 18. Frequency of the noise in the estimated value of transverse gradient is, for example, greater than or equal to 10 Hz.

Moreover, when a value of the first cut-off frequency fc_A is set to be less than that of the second cut-off frequency fc_B in the above-described configuration of the low-pass filter 20, it becomes possible to output a steering assist torque more smoothly so as to correspond to the transverse gradient. As a result, an assisting operation for the steering torque can be prevented from interfering with the driver's operation of steering.

As a comparative example, assume the case where the cut-off frequency of the low-pass filter 20 is fixed. In this configuration, even when the transverse gradient becomes zero, the second assisting amount does not decrease immediately, and the assisting operation of the steering torque is maintained. As a result, the assisting operation of the steering torque may interfere with the driver's operation of steering.

In the configuration, such as in the first embodiment, in which the cut-off frequency of the low pass filter 20 is variable, the second assisting amount decreases immediately. Accordingly, it becomes possible to prevent the assisting operation of the steering torque from interfering with the driver's operation of steering, while decreasing noises contained in the estimated value of transverse gradient, as described above.

The motor controller 21 controls an operation of the motor 5 that generates steering assist torque using the second assisting torque output from the low pass filter 20. Specifically, the second assisting torque input from the low pass filter 20 is set to be a target torque by the motor controller 21. The motor controller 21 causes the motor driver 17 to drive the motor 5 so that the steering assist torque generated by the motor 5 coincides with the target torque. Moreover, a value obtained by adding the second assisting amount to an assisting amount calculated in the case where other known steering control is applied may be set to the target torque by the motor controller 21.

Figure 5:
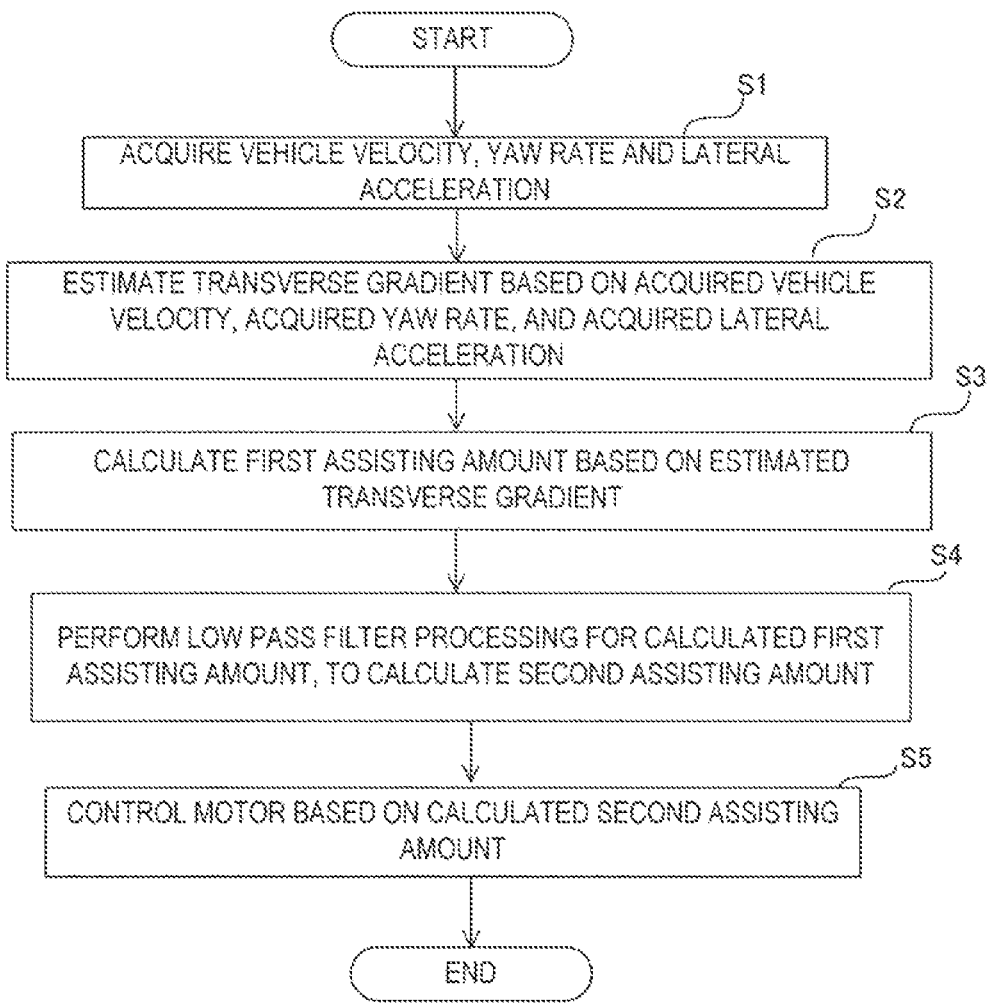
FIG. 5 is a flowchart depicting a series of operations performed in the steering control device according to the first embodiment.

Next, an operation of the steering control device 12 will be described with reference to FIG. 5. FIG. 5 is a flowchart depicting a series of operations of the steering control device 12 according to the first embodiment. Processes in the flowchart shown in FIG. 5 are, for example, performed repeatedly at a predetermined control cycle.

At step S1, the transverse gradient estimator 18 acquires a vehicle velocity from the vehicle velocity sensor 8 via the interface unit 13, a yaw rate from the yaw rate sensor 9, and a lateral acceleration from the lateral acceleration sensor 10. Then, the process proceeds to step S2.

At step S2, the transverse gradient estimator 18 estimates transverse gradient based on the vehicle velocity, the yaw rate, and the lateral acceleration acquired at step S1. Then, the process proceeds to step 3.

At step S3, the assisting amount calculator 19 calculates a first assisting amount using the transverse gradient estimated at step 2. Then, the process proceeds to step S4.

At step S4, the low pass filter 20 performs a low pass filter processing for the first assisting amount calculated at step S3, and thereby calculates a second assisting amount. Then, the process proceeds to step S5.

At step S5, the motor controller 21 controls an operation of the motor 5 using the second assisting amount obtained at step S4. Specifically, the motor controller 21 controls a motor current flowing through the motor 5 using the second assisting amount calculated at step S4. According to the above-described operation, the motor 5 generates a steering assist torque corresponding to the motor current, and thereby assists the driver's operation of steering when the vehicle travels on a transverse gradient road. Then, the process ends.

As described above, according to the first embodiment, the steering control device includes a transverse gradient estimator configured to estimate a transverse gradient of a road surface; an assisting amount calculator configured to calculate a first assisting amount based on the transverse gradient estimated by the transverse gradient estimator; a low pass filter configured to perform a low pass filter processing for the first assisting amount calculated by the assisting amount calculator, and output the first assisting amount subjected to the low pass filter processing as a second assisting amount; and a motor controller configured to control an operation of a motor that generates a steering assist torque using the second assisting amount output from the low pass filter.

Moreover, the low pass filter is configured to switch a cut-off frequency of the low pass filter between a first cut-off frequency and a second cut-off frequency, which is set to be a value higher than that of the first cut-off frequency, depending on whether the second assisting amount increases with time or decreases with time.

In this way, because it is configured to estimate a transverse gradient of a road surface, on which a vehicle travels, and cause the motor to generate a steering assist torque taking into consideration a second assisting amount obtained based on the estimated transverse gradient, it is possible to assist a driver's operation of steering in response to a change in the transverse gradient of the road surface. Moreover, because a change in an assisting amount is adjusted by the low pass filter with a variable cut-off frequency, it becomes possible to prevent an assisting operation of a steering torque from interfering with the driver's operation of steering, while decreasing noises in an estimated value of transverse gradient.

In other words, according to the above-described configuration of the steering control device, the assisting operation of the steering torque can be prevented from interfering with the driver's operation of steering, while assisting the driver's operation of steering in response to a change in the transverse gradient of the road surface.

Second Embodiment

In a second embodiment, a steering control device 12 configured being provided with a processor 24 and an assisting amount corrector 22 in the configuration according to the first embodiment will be explained. In the second embodiment, explanations regarding the same configurations as those in the first embodiment will be omitted, and differences between the first and second embodiments will be mainly explained.

Figure 6:
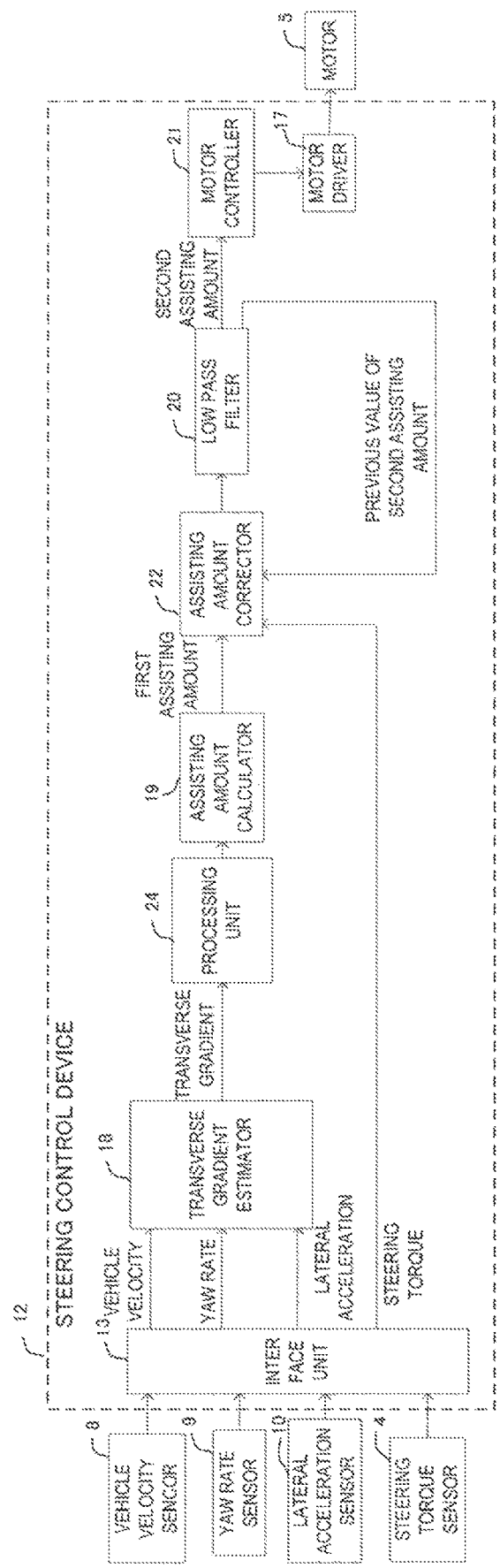
FIG. 6 is a block diagram depicting a configuration of a steering control device according to a second embodiment.

FIG. 6 is a block diagram depicting a configuration of a steering control device 12 according to the second embodiment. FIG. 6 shows that the steering control device 12 includes an interface unit 13, a transverse gradient estimator 18, a processing unit 24, an assisting amount calculator 19, an assisting amount corrector 22, a low pass filter 20, a motor controller 21, and a motor driver 17.

The processing unit 24 performs a rate limiter processing and a dead zone processing, which will be described later, for the transverse gradient estimated by the transverse gradient estimator 18, and outputs the transverse gradient subjected to the processing to the assisting amount calculator 19. The assisting amount calculator 19 calculates a first assisting amount using the transverse gradient input from the processing unit 24, in the same way as that in the first embodiment.

In the following, the rate limiter processing performed by the processing unit 24 will be described. Typically, a transverse gradient of a road surface changes continuously in order to suppress an abrupt change by a transition area. A threshold in the rate limiter is set to a value equivalent to the transition area. According to the above-described processing, it becomes possible to restrict the abrupt change in the transverse gradient estimated by the transverse gradient estimator 18 by the rate limiter processing. Such an abrupt change in the transverse gradient occurs when a vehicle travels on a rough road or the like.

In this way, the processing unit 24 is configured to perform the rate limiter processing for a transverse gradient estimated by the transverse gradient estimator 18. According to the above-described configuration, even when an estimated change in the transverse gradient of a road surface, in which a change in the transverse gradient is restricted by a law, is greater than a change in the transverse gradient, set to be the threshold in the rate limiter processing, the transverse gradient can be prevented from changing abruptly. Thus, it becomes possible to suppress an abrupt change in the assisting amount, and as a result prevent the assisting operation for the steering torque from interfering with the driver's operation of steering.

Next, the dead zone processing performed by the processing unit 24 will be described. According to the dead zone processing, a change in the assisting amount in response to a slight change in the transverse gradient is reduced.

The driver feels fluctuation of the steering wheel at around a neutral position due to the change in the assisting amount in response to the slight change in the transverse gradient. Then, the driver may feel troublesome. For the problem, according to the dead zone processing, it becomes possible to prevent the driver from feeling troublesome, and as a result prevent the assisting operation for the steering torque from interfering with the driver's operation of steering.

The processing unit may be configured to perform either the rate limiter processing or the dead zone processing for the transverse gradient estimated by the transverse gradient estimator 18.

As described above, the processing unit 24 is configured to perform at least one of the rate limiter processing and the dead zone processing for the transverse gradient estimated by the transverse gradient estimator 18.

The assisting amount corrector 22 acquires a steering torque from the steering torque sensor 4 through the interface unit 13. The assisting amount corrector 22 acquires a previous value of a second assisting amount from the low pass filter 20.

The assisting amount corrector 22 corrects the first assisting amount calculated by the assisting amount calculator 19 based on the acquired steering torque and the acquired previous value of the second assisting amount, and outputs the corrected first assisting amount to the low pass filter 20. The low pass filter 20 calculates the second assisting amount by performing the low pass filter processing, described in the first embodiment, for the first assisting amount input from the assisting amount corrector 22.

Figure 7:
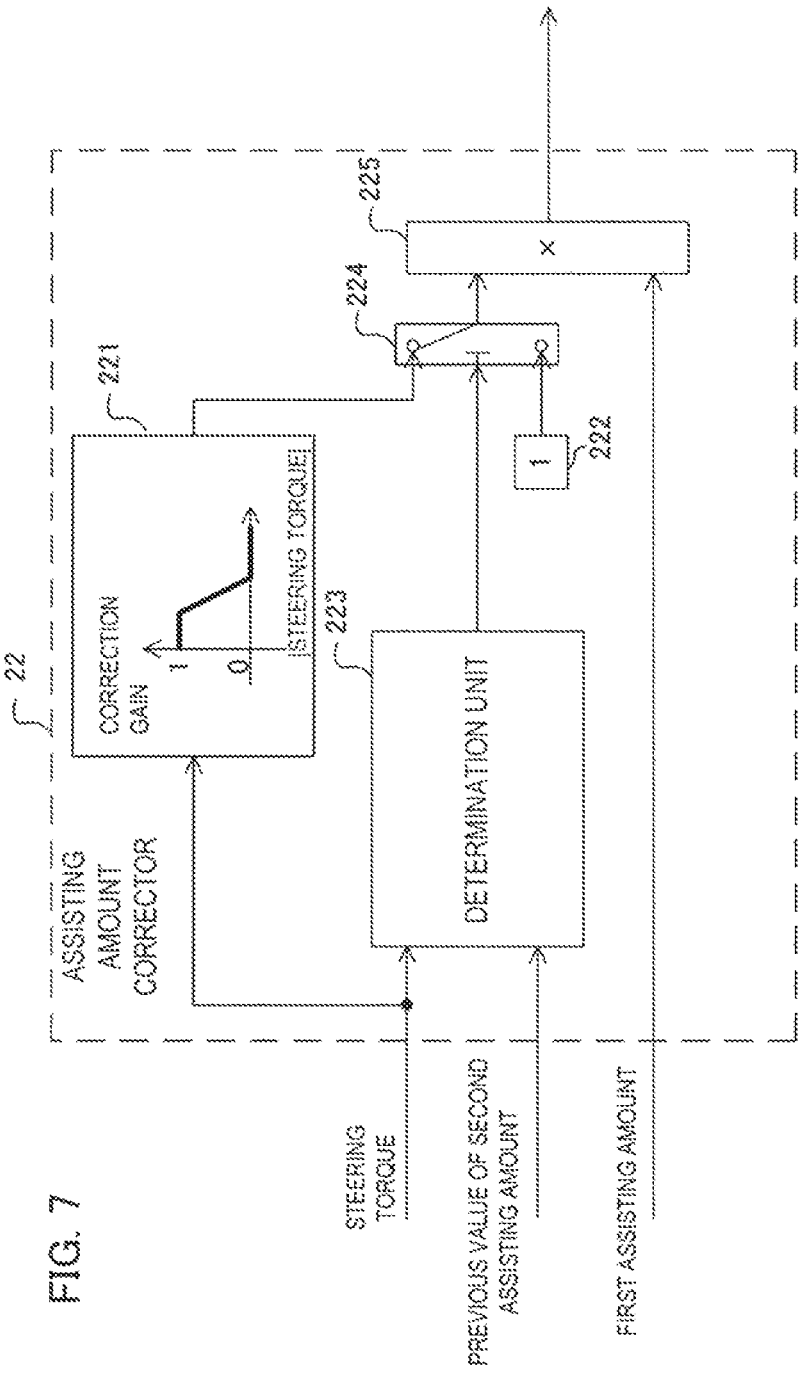
FIG. 7 is a block diagram depicting a configuration of an assisting amount corrector according to the second embodiment of the second embodiment.

A configuration of the assisting amount corrector 22 will be described with reference to FIG. 7. FIG. 7 is a block diagram depicting the configuration of the assisting amount corrector 22 according to the second embodiment.

FIG. 7 shows that the assisting amount corrector 22 includes a correction unit 221, an output unit 222, a determination unit 223, a switching unit 224, and a multiplication unit 225.

The correction unit 221 calculates a correction gain corresponding to a size of the steering torque input from the steering torque sensor 4 according to a steering toque/correction gain map. The correction unit 221 outputs the calculated correction gain to the switching unit 224. In the steering torque/correction gain map, a size of the steering torque is related to a corresponding correction gain, and the correction gain is set in advance to decrease from one to zero as the size of the steering torque increases.

The output unit 222 outputs the fixed value of one to the switching unit 224. The determination unit 223 compares a sign of the steering torque input from the steering torque sensor 4 with a sign of the previous value of the second assisting amount input from the low pass filter 20. According to a result of the above-described comparison, the determination unit 223 determines whether the sign of the steering torque and the sign of the previous value of the second assisting amount are opposite to each other. The determination unit 223 outputs a result of the above-described determination to the switching unit 224.

The switching unit 224 selects either of an output value from the correction unit 221 and an output value from the output unit 222, based on a result of determination which is the output value from the determination unit 223. Then, the switching unit 224 outputs the selected output value to the multiplication unit 225.

When the sign of the steering torque and the sign of the previous value of second assisting amount are determined to be opposite to each other, the switching unit 224 outputs the output value from the correction unit 221 to the multiplication unit 225. On the other hand, when the sign of the steering torque and the sign of the previous value of the second assisting amount are not determined to be opposite to each other, i.e. the steering torque and the previous value of the second assisting amount have the same sign, the switching unit 224 outputs the output value from the output unit 224 to the multiplication unit 225.

The multiplication unit 225 multiplies the first assisting amount input from the assisting amount calculator 19 with the output value from the switching unit 224, and outputs the value obtained by the multiplication to the low pass filter 20.

As described above, when the steering torque and the previous value of the second assisting amount have the same sign, the assisting amount corrector 22 outputs the first assisting amount to the low pass filter without correcting the first assisting amount. A state, in which the steering torque and the previous value of the second assisting amount have the same sign, indicates equivalently that a direction of the driver's operation of steering and a direction of the steering assist torque are the same.

On the other hand, when the sign of the steering torque and the sign of the previous value of the second assisting amount are opposite to each other, the assisting amount corrector 22 corrects the first assisting amount so as to decrease according to the size of the steering torque. Then, the assisting amount corrector 22 outputs the corrected first assisting amount to the low pass filter 20.

When the sign of the steering torque and the sign of the previous value of the second assisting amount are opposite to each other, the driver is considered to steer the vehicle in the direction of going down the transverse gradient road. In this case, the assisting operation for the steering torque may interfere with the driver's operation of steering.

The assisting amount corrector 22 is configured to correct the first assisting amount so as to decrease according to the size of the steering torque, when the sign of the steering torque and the sign of the previous value of the second assisting amount are opposite to each other. According to the above-described configuration, it becomes possible to reduce the first assisting amount, and as a result reduce also the second assisting amount. Thus, the assisting operation for the steering torque can be prevented from interfering with the driver's operation of steering.

As described above, the assisting amount corrector 22 is configured to correct the first assisting amount calculated by the assisting amount calculator 19 according to a steering state of the vehicle. Specifically, the assisting amount corrector 22 is configured to acquire a steering torque detected by the steering torque sensor 4, as a steering state of the vehicle, and correct the first assisting amount according to the acquired steering torque.

Figure 8:
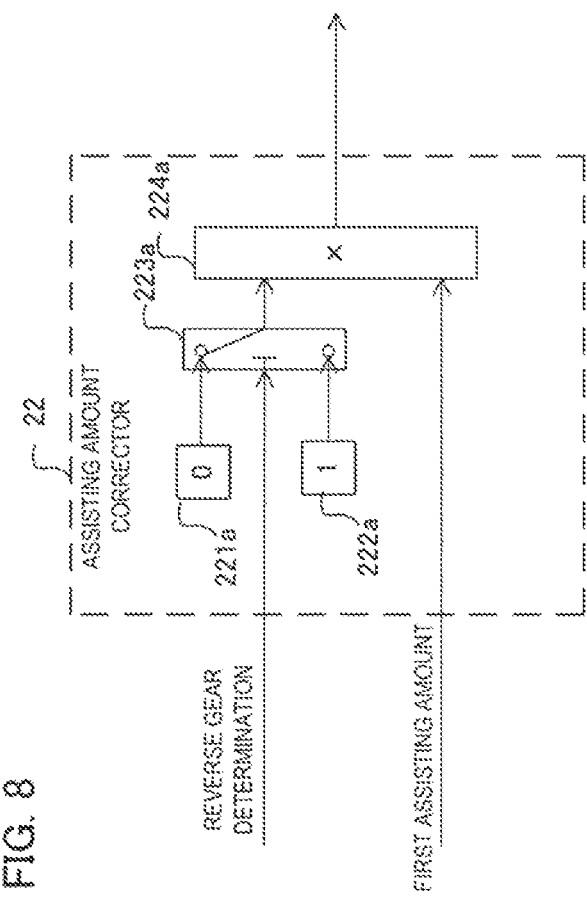
FIG. 8 is a block diagram depicting a first other example of the configuration of the assisting amount corrector according to the second embodiment.

Moreover, the assisting amount corrector 22 may be configured to acquire reverse gear determination indicating whether a gear position of the vehicle is reverse gear, as a steering state of the vehicle (See FIG. 8), and to correct the first assisting amount according to the acquired reverse gear determination. FIG. 8 is a block diagram depicting a first other example of the configuration of the assisting amount corrector 22 according to the second embodiment.

FIG. 8 shows that the assisting amount corrector 22 includes an output unit 221a, an output unit 222a, a switching unit 223a and a multiplication unit 224a.

The output unit 221a outputs a fixed value of zero to the switching unit 223a. The output unit 222a outputs a fixed value of one to the switching unit 223a.

Furthermore, the above-described reverse gear determination is input to the switching unit 223a. The switching unit 223a selects either of the output value from the output nit 221a and the output value from the output unit 222a, based on the input reverse gear determination, and outputs the selected value to the multiplication unit 224a.

When in the reverse gear determination, the vehicle gear position of the reverse gear is indicated, the switching unit 223a outputs the output value from the output unit 221a to the multiplication unit 224a. On the other hand, when in the reverse gear determination, the vehicle gear position of the reverse gear is not indicated, the switching unit 223a outputs the output value from the output unit 222a to the multiplication unit 224a.

The multiplication unit 224a multiplies the first assisting amount input from the assisting amount calculator 19 with the output value from the switching unit 223a, and outputs the obtained value according to the multiplication to the low pass filter 20.

As described above, when the vehicle gear position is the reverse gear, i.e. when the vehicle moves backward, the assisting amount corrector 22 corrects the first assisting amount to zero. Thus, when the vehicle moves backward, the assisting operation according to the transverse gradient can be stopped.

Figure 9:
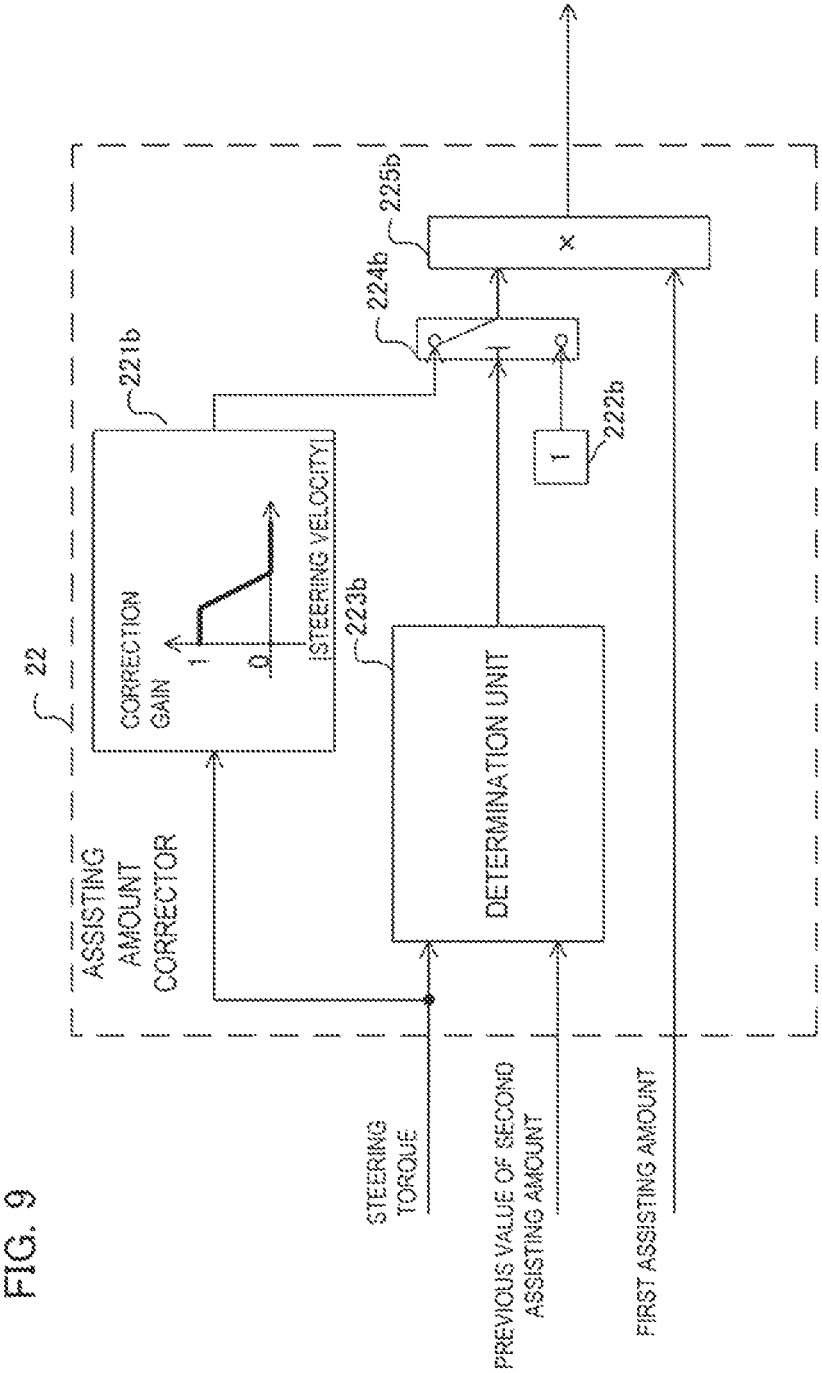
FIG. 9 is a block diagram depicting a second other example of the configuration of the assisting amount corrector according to the second embodiment.

Moreover, the assisting amount corrector 22 may acquire a steering velocity obtained by differentiating a rotation angle of the motor 5 detected by the motor rotation angle sensor 7 (See FIG. 9), as a steering state of the vehicle, and correct the first assisting amount according to the acquired steering velocity. FIG. 9 is a block diagram depicting a second other example of the configuration of the assisting amount corrector 22 according to the second embodiment.

FIG. 9 shows that the assisting amount corrector 22 includes a correction unit 221b, an output unit 222b, a determination unit 223b, a switching unit 224b, and a multiplication unit 225b.

The correction unit 221b calculates a correction gain corresponding to a size of the input steering velocity according to a steering velocity/correction gain map, and outputs the obtained correction gain to the switching unit 224b. The steering velocity/correction gain map is a map in which a size of the steering velocity is related to a corresponding correction gain, and the correction gain is set in advance to decrease from one to zero as the size of the steering velocity increases.

The steering control device 12 calculates the steering velocity input to the correction unit 221b and the determination unit 223b. As described above, the steering velocity is obtained by differentiating a rotation angle of the motor 5 detected by the motor rotation angle sensor 7.

The output unit 222b outputs a fixed value of one to the switching unit 224. The determination unit 223b compares a sign of the input steering velocity with a sign of the previous value of second assisting amount input from the low pass filter 20. According to a result of the above-described comparison, the determination unit 223b determines whether the sign of the steering velocity and the sign of the previous value of the second assisting amount are opposite to each other. The determination unit 223b outputs a result of the above-described determination to the switching unit 224b.

The switching unit 224b selects either of an output value from the correction unit 221b and an output value from the output unit 222b, based on the result of the determination output from the determination unit 223b. Then, the switching unit 224b outputs the selected output value to the multiplication unit 225b.

When the sign of the steering velocity and the sign of the previous value of second assisting amount are determined to be opposite to each other, the switching unit 224b outputs the output value from the output unit 222b to the multiplication unit 225b. On the other hand, when the sign of the steering velocity and the sign of the previous value of second assisting amount are not determined to be opposite to each other, i.e. the steering velocity and the previous value of second assisting amount have the same sign, the switching unit 224b outputs the output value from the correction unit 221b to the multiplication unit 225b.

The multiplication unit 225b multiplies the first assisting amount input from the assisting amount calculator 19 with the output value from the switching unit 224b, and outputs the value obtained by the multiplication to the low pass filter 20.

In this way, when the sign of the steering velocity and the sign of the previous value of second assisting amount are opposite to each other, the assisting amount corrector 22 outputs the first assisting amount to the low pass filter without correcting the first assisting amount.

When the steering velocity and the previous value of second assisting amount have the same sign, the driver is considered to steer the vehicle in the direction of going up the transverse gradient road. In this case, assisting corresponding to the transverse gradient is unnecessary.

Thus, when the steering velocity and the previous value of second assisting amount have the same sign, the assisting amount corrector 22 is configured to correct the first assisting amount so as to decrease according to the size of the steering velocity. According to the above-described configuration, it becomes possible to reduce the assisting amount correspondingly to the transverse gradient, under the state where the driver steers the vehicle in the direction of going up the transverse gradient road.

As described above, the steering control device according to the second embodiment is configured so that the steering control device according to the first embodiment is further provided with the assisting amount corrector that corrects the first assisting amount calculated by the assisting amount calculator correspondingly to the steering state of the vehicle. According to the above-described configuration, the same effect as that in the first embodiment can be obtained, and furthermore, the assisting amount corresponding to the transverse gradient can be reduced as needed depending on the steering state of the vehicle.

Third Embodiment

In a third embodiment, a steering control device 12 configured being provided with a cut-off frequency adjuster 23 instead of the assisting amount corrector 22 in the configuration according to the second embodiment will be explained. In the third embodiment, explanations regarding the same configurations as those in the first and second embodiments will be omitted, and differences from those in the first and second embodiments will be mainly explained.

Figure 10:
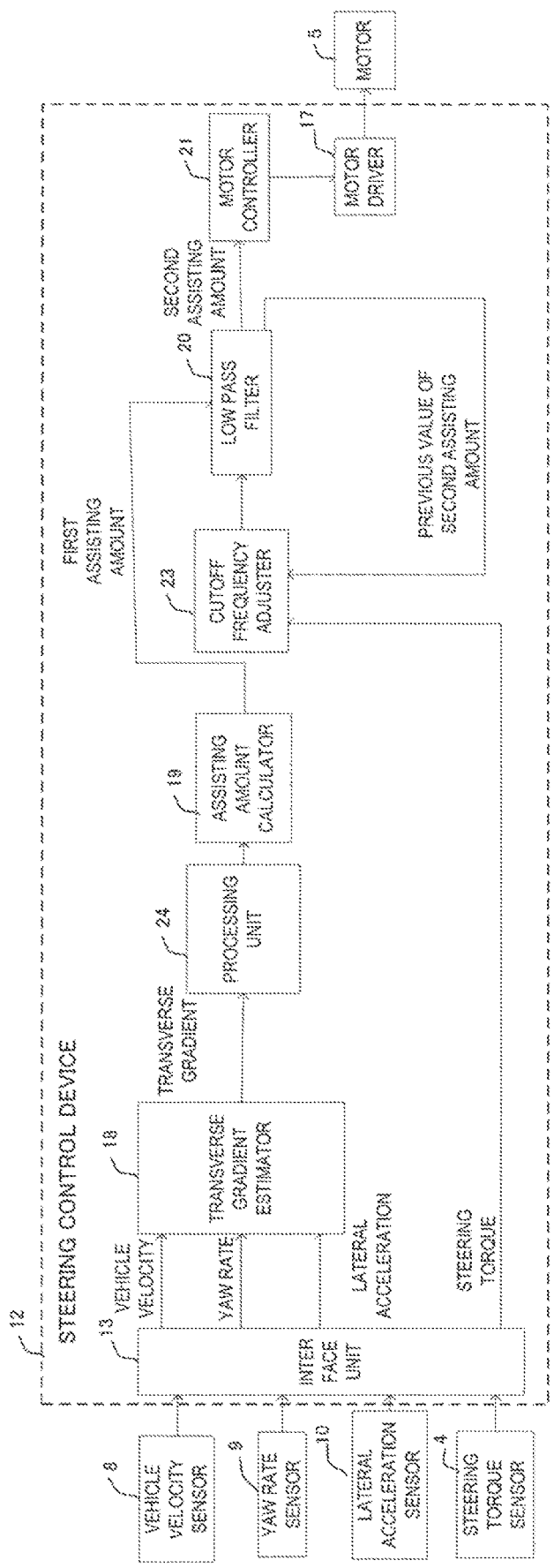
FIG. 10 is a block diagram depicting a configuration of a steering control device according to a third embodiment.

FIG. 10 is a block diagram depicting a configuration of a steering control device 12 according to the third embodiment. FIG. 10 shows that the steering control device 12 includes an interface unit 13, a transverse gradient estimator 18, a processing unit 24, an assisting amount calculator 19, a cut-off frequency adjuster 23, a low pass filter 20, a motor controller 21, and a motor driver 17.

The cut-off frequency adjuster 23 acquires a steering torque from the torque sensor 4 through the interface unit 13. The cut-off frequency adjuster 23 acquires a previous value of second assisting amount from the low pass filter 20.

The cut-off frequency adjuster 23 adjusts a first cut-off frequency fc_A of the low-pass filter 20 based on the acquired steering torque and the previous value of second assisting amount, and provides the adjusted first cut-off frequency fc_A to the low pass filter 20. The low pass filter 20 calculates a second assisting amount by performing the low pass filter processing, explained in the first embodiment, for a first assisting amount input from the assisting amount calculator 19, using the adjusted first cut-off frequency fc_A provided from the cut-off frequency adjuster 23 according to the third embodiment.

Figure 11:
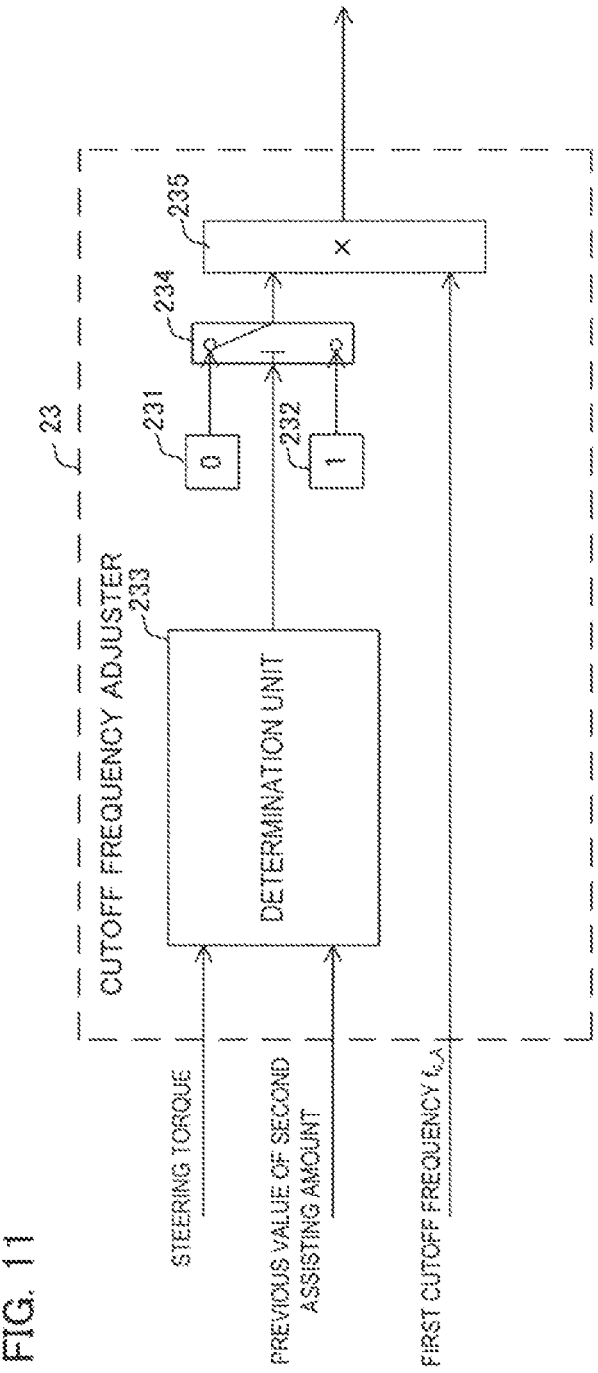
FIG. 11 is a block diagram depicting a configuration of a cut-off frequency adjuster according to the third embodiment.

A configuration of the cut-off frequency adjuster 23 according to the third embodiment will be described with reference to FIG. 11. FIG. 11 is a block diagram depicting the configuration of the cut-off frequency adjuster 23.

FIG. 11 shows that the cut-off frequency adjuster 23 includes an output unit 231, an output unit 232, a determination unit 233, a switching unit 234 and a multiplication unit 235.

The output unit 231 outputs a fixed value of zero to the switching unit 234. The output unit 232 outputs a fixed value of one to the switching unit 234.

The determination unit 233 compares a sign of a steering torque input from the steering torque sensor 4 with a sign of the previous value of second assisting amount input from the low pass filter 20. According to the above-described comparison, the determination unit 223 determines whether the sign of the steering torque and the sign of the previous value of second assisting amount are opposite to each other. The determination unit 223 outputs a result of the above-described determination to the switching unit 234.

The switching unit 224 selects either of an output value from the output unit 231 and an output value from the output unit 232, based on a result of determination which is the output value from the determination unit 233. Then, the switching unit 234 outputs the selected output value to the multiplication unit 235.

When the sign of the steering torque and the sign of the previous value of second assisting amount are determined to be opposite to each other, the switching unit 234 outputs the output value from the output unit 231 to the multiplication unit 235. On the other hand, when the sign of the steering torque and the sign of the previous value of second assisting amount are not determined to be opposite to each other, i.e. the steering torque and the previous value of the second assisting amount have the same sign, the switching unit 234 outputs the output value from the output unit 232 to the multiplication unit 235.

The multiplication unit 235 multiplies the first cut-off frequency fc_A of the low pass filter 20 with the output value from the switching unit 234, and outputs the value obtained by the multiplication to the low pass filter 20.

As described above, the cut-off frequency adjuster 23 adjusts the first cut-off frequency fc_A to zero, when the sign of the steering torque and the sign of the previous value of second assisting amount are opposite to each other. According to the above-described processing, it becomes possible to prevent the second assisting amount from increasing, when the driver is considered to steer the vehicle in the direction of going down the transverse gradient road. As a result, the assisting operation for the steering torque can be prevented from interfering with the driver's operation of steering.

When the sign of the steering torque and the sign of the previous value of second assisting amount are opposite to each other, the cut-off frequency adjuster 23 may adjust the second cut-off frequency fc_B to change greatly so as to be a set value set in advance. Thus, the decrease in the assisting amount can be accelerated. As a result, the assisting operation for the steering torque can be prevented from interfering with the driver's operation of steering.

Figure 12:
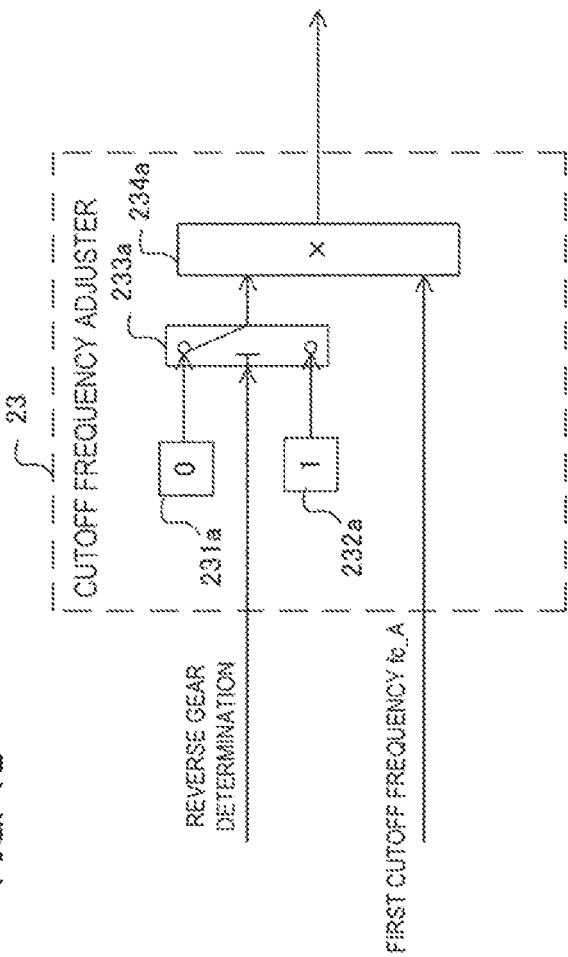
FIG. 12 is a block diagram depicting a first other example of the configuration of the cut-off frequency adjuster according to the third embodiment.

Moreover, the cut-off frequency adjuster 23 may be configured to acquire reverse gear determination indicating whether a gear position of the vehicle is reverse gear, as a steering state of the vehicle, as shown in FIG. 12, and adjust the first cut-off frequency fc_A depending on the acquired reverse gear determination. FIG. 12 is a block diagram depicting a first other example of the configuration of the cut-off frequency adjuster 23 according to the third embodiment.

FIG. 12 shows that the cut-off frequency adjuster 23 includes an output unit 231a, an output unit 232a, a switching unit 233a and a multiplication unit 234a.

The output unit 231a outputs a fixed value of zero to the switching unit 233a. The output unit 232a outputs a fixed value of one to the switching unit 233a.

Furthermore, the above-described reverse gear determination is input to the switching unit 233a. The switching unit 233a selects either of the output value from the output unit 231a and the output value from the output unit 232a, and outputs the selected value to the multiplication unit 234a.

When the reverse gear determination indicates the vehicle gear position of the reverse gear, the switching unit 233a outputs the output value from the output unit 231a to the multiplication unit 234a. On the other hand, when the reverse gear determination does not indicate the vehicle gear position of the reverse gear, the switching unit 233a outputs the output value from the output unit 232a to the multiplication unit 234a.

The multiplication unit 234a multiplies the first cut-off frequency fc_A of the low pass filter 20 with the output value from the switching unit 233a, and outputs the obtained value according to the multiplication to the low pass filter 20.

In this way, for the vehicle gear position of the reverse gear, i.e. when the vehicle moves backward, the cut-off frequency adjuster 23 adjusts the first cut-off frequency fc_A to zero. Then, when the vehicle moves backward, the first cut-off frequency fc_A becomes zero, and thereby an increase in the second assisting amount stops.

Figure 13:
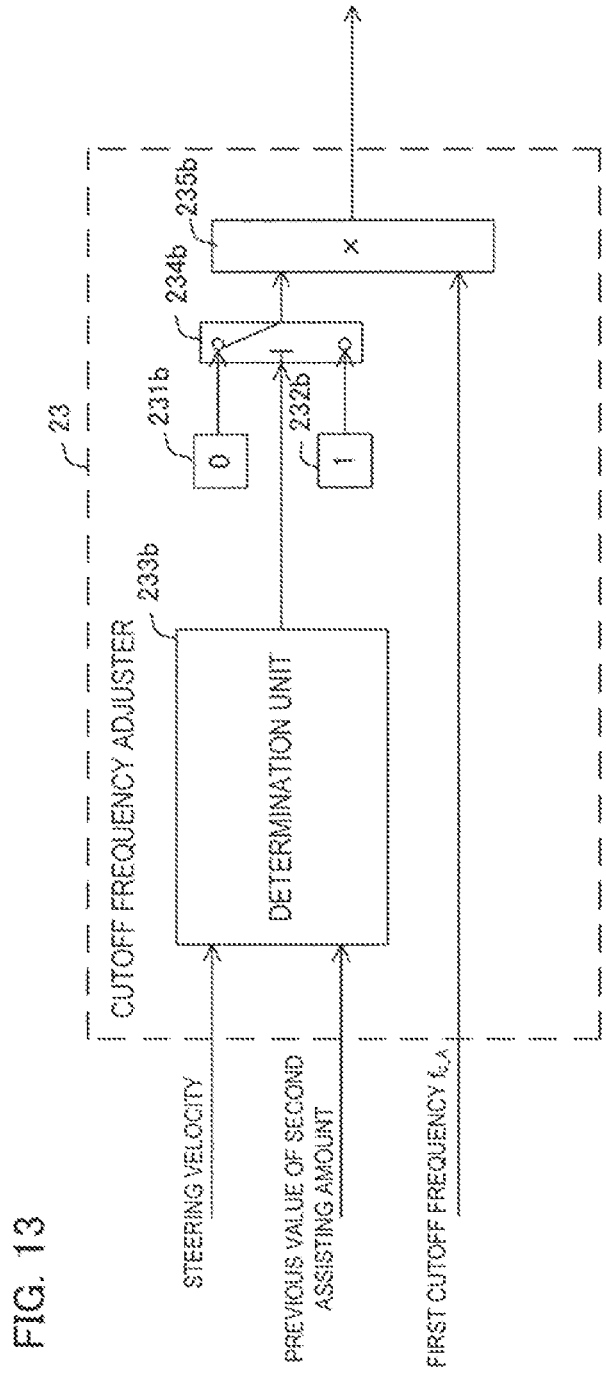
FIG. 13 is a block diagram depicting a second other example of the configuration of the cut-off frequency adjuster according to the third embodiment.

Moreover, the cut-off frequency adjuster 23 may acquire a steering velocity obtained by differentiating a rotation angle of the motor 5 detected by the motor rotation angle sensor 7, as shown in FIG. 13, as a steering state of the vehicle, and adjust the first cut-off frequency fc_A according to the acquired steering velocity. FIG. 13 is a block diagram depicting a second other example of the configuration of the cut-off frequency adjuster 23 according to the third embodiment.

FIG. 13 shows that the cut-off frequency adjuster 23 includes an output unit 231b, an output unit 232b, a determination unit 233b, a switching unit 234b and a multiplication unit 235b.

The steering control device 12 calculates the steering velocity input to the determination unit 233b. The steering velocity is obtained by differentiating a rotation angle of the motor 5 detected by the motor rotation angle sensor 7.

The determination unit 233b compares a sign of the input steering velocity with a sign of the previous value of second assisting amount input from the low pass filter 20. According to the above-described comparison, the determination unit 233b determines whether the sign of the steering velocity and the sign of the previous value of the second assisting amount are opposite to each other. The determination unit 233b outputs a result of the above-described determination to the switching unit 234b.

The switching unit 234b selects either of an output value from the output unit 231b and an output value from the output unit 232b, based on the result of the determination output from the determination unit 233b. Then, the switching unit 234b outputs the selected output value to the multiplication unit 235b.

When the sign of the steering velocity and the sign of the previous value of second assisting amount are determined to be opposite to each other, the switching unit 234b outputs the output value from the output unit 232b to the multiplication unit 235b. On the other hand, when the sign of the steering velocity and the sign of the previous value of second assisting amount are not determined to be opposite to each other, i.e. the steering velocity and the previous value of second assisting amount have the same sign, the switching unit 234b outputs the output value from the output unit 231b to the multiplication unit 235b.

The multiplication unit 235b multiplies the first cut-off frequency fc_A of the low pass filter 20 with the output value from the switching unit 234b, and provides the value obtained by the multiplication to the low pass filter 20.

In this way, when the steering velocity and the previous value of second assisting amount have the same sign, the cut-off frequency adjuster 23 adjusts the first cut-off frequency to zero. Thus, when the driver is considered to steer the vehicle in the direction of going up the transverse gradient road, the first cut-off frequency fc_A becomes zero, and thereby an increase in the second assisting amount stops.

Moreover, the cut-off frequency adjuster 23 may determine whether the vehicle travels linearly based on the calculated steering velocity and the detected yaw rate, and adjust the first cut-off frequency fc_A of the low pass filter 20, based on a result of the determination. A threshold value of the steering velocity and a threshold value of the yaw rate are values set in advance.

In this case, the cut-off frequency adjuster 23 determines that the vehicle travels linearly when the steering velocity is less than the threshold value of steering velocity and the yaw rate is less than the threshold value of yaw rate. Moreover, the cut-off frequency adjuster 23 determines that the vehicle does not travel linearly, otherwise.

When the vehicle is determined not to travel linearly, the cut-off frequency adjuster 23 adjusts the first cut-off frequency to zero. On the other hand, when the vehicle is determined to travel linearly, the cut-off frequency adjuster 23 does not adjust the first cut-off frequency fc_A. According to the above-described operation, when the vehicle travels linearly on the transverse gradient road, the assisting amount can be increased. When the vehicle does not travel linearly on the transverse gradient road it becomes possible to stop the increase in the assisting amount. As a result, the assisting operation for the steering torque can be prevented from interfering with the driver's operation of steering.

As described above, the steering control device according to the third embodiment is configured so that the steering control device according to the second embodiment is further provided with, instead of the assisting amount corrector, the cut-off frequency adjuster for adjusting the first cut-off frequency of the low pass filter correspondingly to the steering state of the vehicle. According to the above-described configuration, the same effect as that in the second embodiment can be obtained even when the steering control device is configured as above.

Fourth Embodiment

In a fourth embodiment, a steering control device 12, in which the assisting amount calculator 19 calculates a first assisting amount using a method different from those in the first to third embodiments, will be explained. In the fourth embodiment, explanations regarding the same configurations as those in the first to third embodiments will be omitted, and differences from those in the first to third embodiments will be mainly explained.

Figure 14:
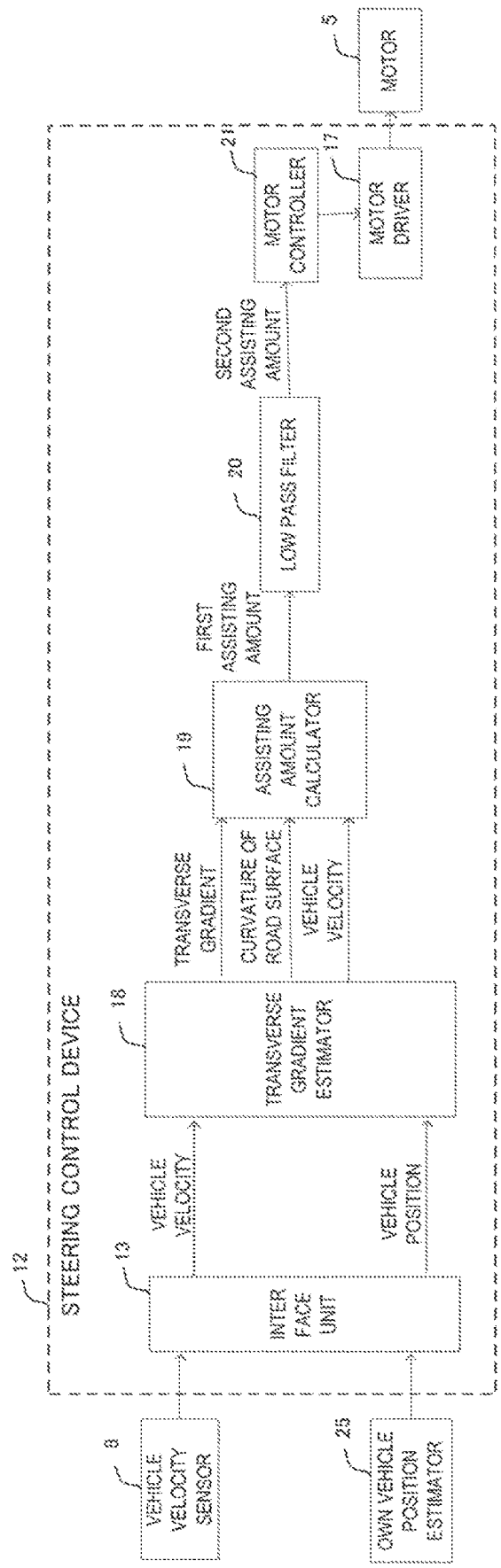
FIG. 14 is a block diagram depicting a configuration of a steering control device according to a fourth embodiment.

FIG. 14 is a block diagram depicting a configuration of a steering control device 12 according to the fourth embodiment. FIG. 14 shows that the steering control device 12 includes an interface unit 13, a transverse gradient estimator 18, an assisting amount calculator 19, a low pass filter 20, a motor controller 21 and a motor driver 17.

The transverse gradient estimator 18 acquires a vehicle velocity from the vehicle velocity sensor 8 through the interface unit 13, and acquires an own position of the vehicle (vehicle position) from an own vehicle position estimator 25. The own vehicle position estimator 25 estimates the own position of the vehicle, at which the vehicle travels, using a known method, and outputs the own position of the vehicle.

The transverse gradient estimator 18 stores traveling road information. The traveling road information is data set in advance, in which an own position of the vehicle is associated with a transverse gradient and a curvature of road surface corresponding to the own position of the vehicle. Moreover, the transverse gradient estimator 18 may be configured using a navigation system.

The transverse gradient estimator 18 determines a transverse gradient and a curvature of road surface corresponding to an own position of the vehicle acquired from the own vehicle position estimator 25 based on the traveling road information. The transverse gradient estimator 18 outputs the transverse gradient and the curvature of road surface, determined as above, to the assisting amount calculator 19. The transverse gradient estimator 18 outputs the vehicle velocity acquired from the vehicle velocity sensor 8 to the assisting amount calculator 19.

Moreover, the transverse gradient estimator 18 may estimate the transverse gradient and the curvature of road surface, using detection values acquired from an acceleration sensor and angular velocity sensor provided in the vehicle, using a known method.

The assisting amount calculator 19 calculates a first assisting amount based on the transverse gradient and the curvature of road surface, input from the transverse gradient estimator 18; and the vehicle velocity, and outputs the calculated first assisting amount to the low pass filter 20. The low pass filter 20 performs the low pass filter processing, described in the first embodiment, for the first assisting amount input from the assisting amount calculator 19, and thereby calculates a second assisting amount.

Figure 15:
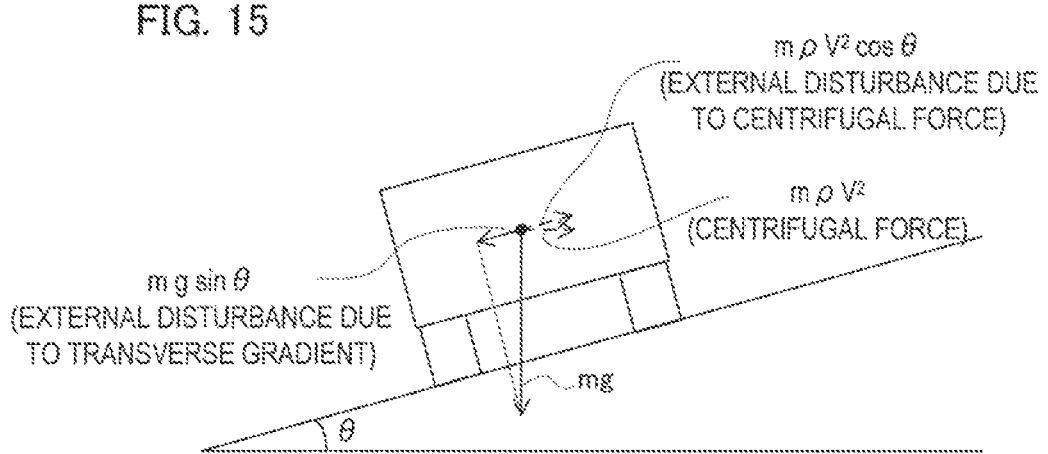
FIG. 15 is a diagram schematically depicting an external disturbance due to a transverse gradient and an external disturbance due to a centrifugal force acting on a vehicle according to the fourth embodiment.

In the following, an example of a method for calculating the first assisting amount by the assisting amount calculator 19 will be explained with reference to FIG. 15. FIG. 15 is a diagram schematically depicting an external disturbance due to the transverse gradient, and an external disturbance due to a centrifugal force acting on the vehicle according to the fourth embodiment.

The assisting amount calculator 19 obtains the external disturbance Fy_dist acting on the vehicle in the lateral direction using the transverse gradient θ and the curvature of road surface ρ, input from the transverse gradient estimator 18, and the vehicle velocity V, according to formula (6) as follows:

$$Fy\_dist = m\,g\,\sin\theta - m\rho V^2 \cos\theta. \quad (6)$$

The assisting amount calculator 19 obtains a compensation torque Tcomp1 so as to cancel the above-described external disturbance Fy_dist, using the same method as that in the first embodiment. The compensation torque Tcomp1 corresponds to the first assisting amount.

Thus, the assisting amount calculator 19 is configured to calculate the first assisting amount based on the transverse gradient and the curvature of road surface input from the transverse gradient estimator 18, and the vehicle velocity. According to the above-described configuration, even when the external disturbance due to the transverse gradient is not balanced with the external disturbance due to the centrifugal force because of a low vehicle velocity and as a result the vehicle deflects, it becomes possible to assist the driver's operation of steering so as to suppress the deflection.

As described above, different from the first to third embodiments, the transverse gradient estimator according to the fourth embodiment is configured to estimate the transverse gradient and the curvature of road surface, corresponding to the own position of the vehicle estimated by the own vehicle position estimator, based on traveling road information. Moreover, the assisting amount calculator is configured to calculate the first assisting amount based on the vehicle velocity detected by the vehicle velocity sensor, and the transverse gradient and the curvature of road surface estimated by the transverse gradient estimator. According to the above-described configuration, the same effects as those in the first to third embodiments can be obtained, and it becomes possible to assist the driver's operation of steering in response to the case where the vehicle deflects.

The first to fourth embodiments have been described as examples. However, the present invention is not limited to the respective configuration described in the first to fourth embodiments. The configurations of the first to fourth embodiments may be combined, modified or omitted as appropriate without departing from the scope of the invention.

REFERENCE SIGNS LIST 1 steering wheel, 2 steering shaft, 3 turning wheel, 4 steering torque sensor, 5 motor, 6 deceleration mechanism, 7 motor rotation angle sensor, 8 vehicle velocity sensor, 9 yaw rate sensor, 10 lateral acceleration sensor, 11 current sensor, 12 steering control device, 13 interface unit, 14 CPU, 15 ROM, 16 RAM, 17 motor driver, 18 transverse gradient estimator, 19 assisting amount calculator, 20 low pass filter, 201 subtraction unit, 202 gain unit, 203 gain unit, 204 determination unit, 205 switching unit, 206 addition unit, 207 delay unit, 21 motor controller, 22 assisting amount corrector, 221 correction unit, 222 output unit, 223 determination unit, 224 switching unit, 225 multiplication unit, 221a output unit, 222a output unit, 223a switching unit, 224a multiplication unit, 221b correction unit, 222b output unit, 223b determination unit, 224b switching unit, 225b multiplication unit, 23 cut-off frequency adjuster, 231 output unit, 232 output unit, 233 determination unit, 234 switching unit, 235 multiplication unit, 231a output unit, 232b output unit, 233a switching unit, 234a multiplication unit, 231b output unit, 232b output unit, 233b determination unit, 234b switching unit, 235b multiplication unit, 24 processing unit, 25 own vehicle position estimator.

The invention claimed is:

1. A steering control device comprising at least one processor configured to:
   estimate a transverse gradient of a road surface on which a vehicle travels;
   calculate a first assisting amount based on the transverse gradient;
   perform a low pass filter processing for the first assisting amount, and output the first assisting amount subjected to the low pass filter processing, as a second assisting amount; and
   control a motor that generates a steering assist torque, using the second assisting amount, wherein the at least one processor switches a cut-off frequency of the low pass filter processing between a first cut-off frequency and a second cut-off frequency that is set to a value higher than the first cut-off frequency, depending on whether the second assisting amount increases with time or the second assisting amount decreases with time, wherein the first assisting amount and the second assisting amount are amounts of steering torque used to assist a driver in steering.

2. The steering control device according to claim 1, wherein the at least one processor sets the cut-off frequency to the first cut-off frequency when the second assisting amount increases with time, and sets the cut-off frequency to the second cut-off frequency when the second assisting amount decreases with time.

3. The steering control device according to claim 1, wherein the at least one processor corrects the first assisting amount according to a steering state the vehicle.

4. The steering control device according to claim 3, wherein the at least one processor acquires, as the steering state, the steering torque acting on a steering shaft via a steering wheel of the vehicle, the steering torque being detected by a steering torque sensor, and corrects the first assisting amount according to the acquired steering torque.

5. The steering control device according to claim 3, wherein the at least one processor acquires, as the steering state, a steering velocity obtained by differentiating a rotational angle of the motor, the rotational angle being detected by a motor rotational angle sensor, and corrects the first assisting amount according to the acquired steering velocity.

6. The steering control device according to claim 3, wherein the at least one processor acquires, as the steering state, reverse gear determination indicating whether a gear position of the vehicle is a reverse gear position, and corrects the first assisting amount according to the acquired reverse gear determination.

7. The steering control device according to claim 1, wherein the at least one processor adjusts the first cut-off frequency according to a steering state of the vehicle.

8. The steering control device according to claim 7, wherein the at least one processor acquires, as the steering state, the steering torque acting on a steering shaft via a steering wheel of the vehicle, the steering torque being detected by a steering torque sensor, and adjusts the first cut-off frequency according to the acquired steering torque.

9. The steering control device according to claim 7, wherein the at least one processor acquires, as the steering state, a steering velocity obtained by differentiating a rotational angle of the motor, the rotational angle being detected by a motor rotational angle sensor, and adjusts the first cut-off frequency according to the acquired steering velocity.

10. The steering control device according to claim 7, wherein the at least one processor acquires, as the steering state, reverse gear determination indicating whether a gear position of the vehicle is a reverse gear position, and adjusts the first cut-off frequency according to the acquired reverse gear determination.

11. The steering control device according to claim 1, wherein the at least one processor performs at least one of rate limiter processing and dead zone processing for the transverse gradient.

12. The steering control device according to claim 1, wherein the at least one processor estimates the transverse gradient based on a vehicle velocity of the vehicle detected by a vehicle velocity sensor detecting the vehicle velocity, a yaw rate of the vehicle detected by a yaw rate sensor detecting the yaw rate of the vehicle, and a lateral acceleration of the vehicle detected by a lateral acceleration sensor detecting the lateral acceleration of the vehicle.

13. The steering control device according to claim 1, wherein the at least one processor stores traveling road information, in which a vehicle position of the vehicle is associated with the transverse gradient and a curvature of the road surface corresponding to the vehicle position, estimates, based on the traveling road information, the transverse gradient and the curvature of the road surface corresponding to the vehicle position, calculates the first assisting amount based on a vehicle velocity of the vehicle, and the transverse gradient and the curvature of the road surface.

* * * * *